May 7, 1963
R. C. MEADE
3,089,034
LIGHT SENSITIVE DETECTION CIRCUIT
Filed Aug. 30, 1960
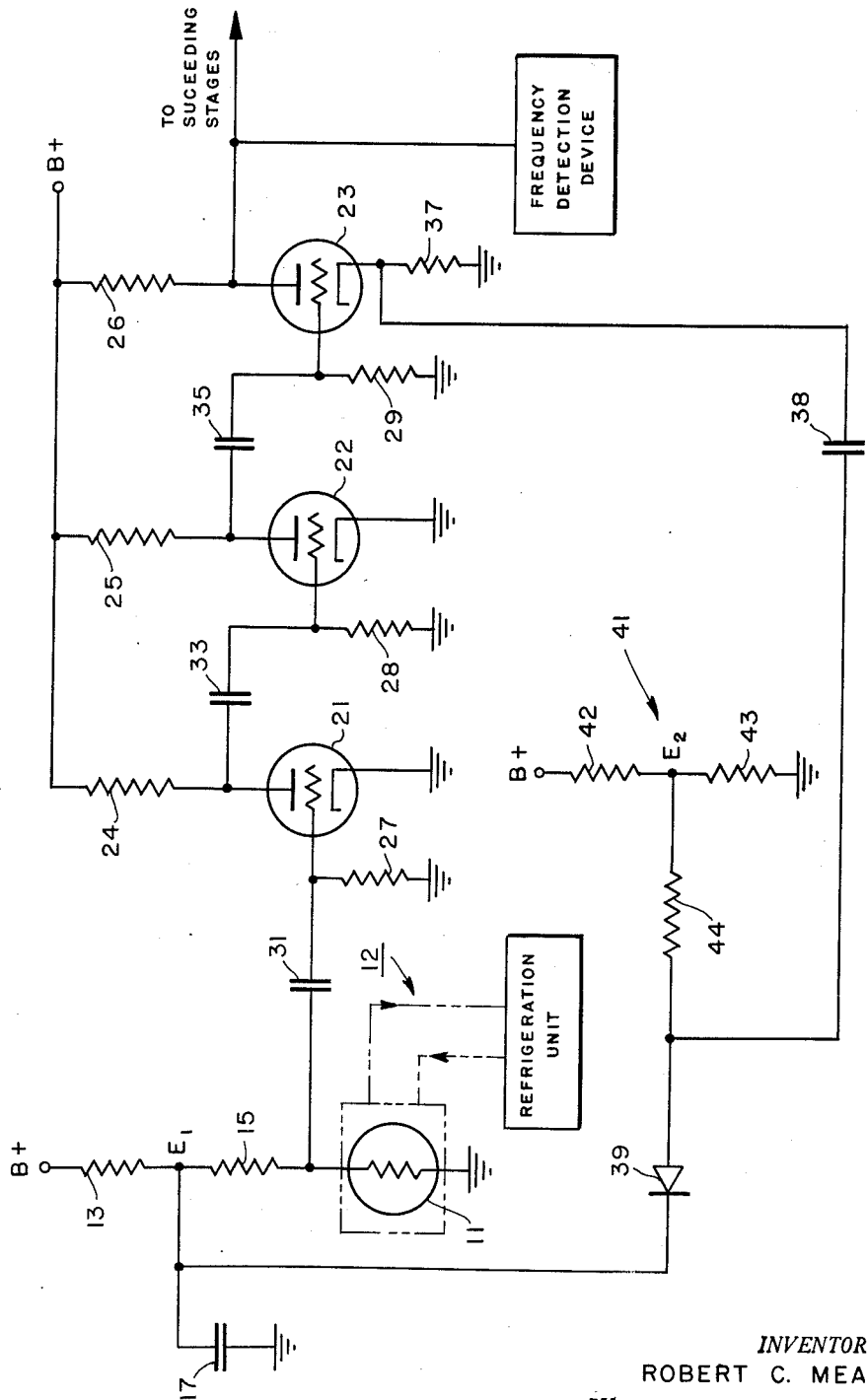
INVENTOR.
ROBERT C. MEADE
BY
P. H. Fisht
Charles P. B. Curry
ATTORNEYS.

3,089,034
LIGHT SENSITIVE DETECTION CIRCUIT
Robert C. Meade, China Lake, Calif., assignor to the United States of America as represented by the Secretary of the Navy
Filed Aug. 30, 1960, Ser. No. 53,020
3 Claims. (Cl. 250—214)
(Granted under Title 35, U.S. Code (1952), sec. 266)

The invention herein described may be manufactured and used by or for the Government of the United States of America for governmental purposes without the payment of any royalties thereon or therefor.

The present invention relates to a temperature responsive detection device and in particular to such a device having a regenerative feedback circuit which drives an amplifier into oscillation when the sensed temperature exceeds a predetermined value.

The resistance of infra-red detector cells of the lead sulfide type, for example, varies inversely with cell temperature and inversely with infra-red energy. The change of resistance of the cell as a result of infra-red energy change is small as compared to the change of cell resistance as a result of the change of cell temperature. In addition, the response characteristic of an infra-red cell, responsive to and operating in long infra-red wave length regions, is at an optimum at very low temperatures. Therefore, in order to successfully operate an infra-red detector cell of this type, it is necessary to maintain the cell at a very low constant temperature. Cooling devices which are not subject to manual control, in missiles for example, are seldom completely reliable and it is necessary that a temperature detector be provided in order to determine whether or not operation is permissible.

Prior temperature responsive detection devices have included micro-ammeter detection circuits. However, since the currents to be detected are extremely small, the accuracy and reliability of equipment of this type is not satisfactory. Furthermore, additional lead lines from the missile, for example, are necessary in order to provide the required information.

The present invention overcomes the aforementioned difficulties by utilizing existing and conventional circuitry (power supply, amplifier stages, frequency detector, etc.) and incorporating a diode-controlled regenerative feedback circuit to drive the amplifier into oscillation when the temperature of the infra-red detector cell increases to a predetermined value. The tone detected by the frequency detector (an earphone, for example) when the amplifier is in oscillation is readily distinguishable from the tone produced by the normal cell output signal thereby providing information for the operator as to whether or not operation is permissible.

An object of the present invention is to provide a simple, inexpensive temperature detection device.

Another object is to sense a predetermined temperature of an infra-red sensitive detection cell.

Still another object is to oscillate the amplifier of an infra-red sensitive detection cell when the temperature of the cell exceeds a predetermined value.

Still another object is to oscillate the amplifier of an infra-red sensitive detection cell by means of a regenerative feedback which is operative when the temperature of the cell exceeds a predetermined value.

Still another object is to oscillate an amplifier by means of a regenerative feedback when the input voltage is at a predetermined value.

Other objects and many of the attendant advantages of this invention will become readily appreciated as the same becomes better understood by reference to the following detailed description when considered in connection with the accompanying drawings wherein:

The FIGURE is a schematic diagram of the present invention.

In the drawing is shown detector cell 11 which is responsive to long wave length infra-red radiation. For successful operation, cells of this type must be maintained at very low temperatures, $-196°$ C. for example, by means of separate refrigeration equipment shown by broken lines and designated generally by numeral 12. A detector cell of this type has a large negative temperature coefficient and when cooled to its operating temperature, $-196°$ C. for example, its resistance will be approximately 3,500K ohms and when at room temperature its resistance will be approximately 50K ohms. The cell bias circuit consists of decoupling resistor 13 and cell load resistor 15 which series connect cell 11 with a B+ D.C. power supply. Capacitor 17 is provided to filter A.C. components from the D.C. B+ power supply. It should be noted that the voltage at $E_1$, between resistors 13 and 15, will decrease with increased detector cell temperature since the resistance of the detector cell decreases with increased temperature.

An R-C amplifier circuit is provided which is conventional and consists of triodes 21, 22 and 23 which are plate biased by B+ power through resistors 24, 25 and 26, respectively, and grid biased through resistors 27, 28 and 29, respectively. The output of cell 11 is coupled to the grid of triode 21 through coupling capacitor 31 and triodes 22 and 23 are coupled by capacitors 33 and 35, respectively. The triode 23 is of the cathode follower type, the cathode thereof being connected through resistor 37 to ground.

The feedback circuit is regenerative and connects the cathode of triode 23 to the grid of triode 21 through D.C. blocking capacitor 38, diode 39, resistor 15 and capacitor 31. It can be seen that the feedback is regenerative since the phase shift from the grid of triode 21 to the grid of cathode follower triode 23 is 360° and since the cathode voltage follows the grid voltage of triode 23, the cathode of triode 23 has a 360° phase shift from the grid of triode 21. The cathode of diode 39 is biased by the voltage at $E_1$. A voltage dividing network designated generally by numeral 41 provides a voltage $E_2$ between resistors 42 and 43. The anode of diode 39 is biased by the voltage at $E_2$ through current limiting resistor 44. Since very little current will flow through resistor 44, the potential at the cathode is virtually the same as the potential at $E_2$. Diode 39, which may be of the silicon type, is used as a switch and provides infinite resistance when it is non-conducting. Diode 39 is non-conducting when $E_1 > E_2$ and is conducting when $E_1 < E_2$.

The gain of the three stage amplifier is such that the amplifier will oscillate, at a frequency determined by the amplifier characteristics, when the regenerative feedback signal is applied to the input thereof. Voltage gain of the amplifier is sufficient to cause oscillation even though the feedback is not connected directly to the grid but through the cell bias circuit wherein filter capacitor 17 provides bypass action. The voltage at $E_2$ is chosen to be less than the voltage at $E_1$ when the cell is at its correct operating temperature.

The following table shows by way of example, the values of resistance, bias voltage and capacitance in one embodiment of the network of the present invention:

| Reference Numeral | Unit | Value |
|---|---|---|
| 13 | kiloohms | 500 |
| 15 | do | 500 |
| 42 | do | 10 |
| 43 | do | 33 |
| 44 | megohm | 1 |
| 37 | microfarad | .01 |
| B+ | volts | 175 |
| $E_1$ | do | 87-155 |
| $E_2$ | do | 134 |

The operation of the device is as follows: When the cell is at its normal operating temperature ($-196°$ C.) the voltage at $E_1$ is approximately 155 volts. Since $E_2$ is approximately 134 volts, diode 39 is reverse biased and provides infinite resistance. Therefore, the feedback from triode 23 is not applied to the grid of triode 21 and the amplifier functions as an amplifier of the signal from cell 11. As the temperature of cell 11 increases, the voltage at $E_1$ decreases. Diode 39 will conduct when $E_1$ decreases to a value less than $E_2$ since it is then forward biased. When diode 39 conducts, a regenerative feedback signal from the cathode of triode 23 is applied to the grid of triode 21 which causes the amplifier to oscillate at its natural frequency. The output of the amplifier is applied to a frequency responsive device, earphones for example, which indicates whether the amplifier is oscillating or is normally amplifying the cell output signal. It can therefore be seen that when the cell becomes warm, the frequency responsive device indicates this condition (oscillation frequency) and the operator becomes aware that operation is not permissible. However, when the cell is cooled to its operation temperature, the operator is aware that operation is permissible.

Obviously many modifications and variations of the present invention are possible in the light of the above teachings. For example, different values of resistors, capacitors and biases could be selected, more or less amplifier stages could be employed so long as the regenerative feedback was of sufficient strength to drive the amplifier into oscillation, different amplifier designs could be employed, and the circuit could be employed to detect voltage characteristics other than those resulting from temperature changes. It is therefore to be understood that within the scope of the appended claims the invention may be practiced otherwise than as specifically described.

What is claimed is:

1. A detection device comprising an amplifier, a detection cell responsive to light energy, the resistance of said detection cell varying inversely with the temperature of said cell, a resistor, one side of said resistor being connected to a D.C. potential source, the other side of said resistor being connected to one side of said detection cell, the other side of said detection cell being connected to ground, said one side of said detection cell being connected to the input of said amplifier, a regenerative feedback network for interconnecting the output and input of said amplifier, and means responsive to the voltage at said other side of said resistor for controlling transmission of the amplifier output signal through said network, wherein said last mentioned means comprises a diode the cathode of which is connected to said other side of said resistor and the anode of which is connected to a fixed D.C. potential, said diode being non-conducting when the voltage at said other side of said resistor is above a predetermined value, and transmitting said amplifier output signal when the voltage at said other side of said resistor is less than said predetermined value thereby causing oscillation of said amplifier.

2. A detection device comprising an amplifier, a detection cell responsive to infra-red energy, the resistance of said detection cell varying inversely with the temperature of said cell, first and second resistors and said cell respectively connected in series with a D.C. potential source, the input of said amplifier being connected between said second resistor and said cell, a regenerative feedback circuit comprising a diode, the cathode of said diode being connected between said first and second resistors and the anode of said diode being connected to the output of said amplifier and to a D.C. potential source, the D.C. voltage at said anode being less than the D.C. voltage at said cathode when said cell is at a temperature not greater than a predetermined value, thereby preventing the transmission of the regenerative amplifier output signal to said input, and the D.C. voltage at said anode being greater than the D.C. voltage at said cathode when the cell is at a temperature greater than said predetermined value, thereby permitting transmission of said regenerative output signal to said input and thereby causing said amplifier to oscillate.

3. The device of claim 2 wherein a frequency detection device is connected to the output of said amplifier for detecting whether the amplifier is oscillating.

References Cited in the file of this patent

UNITED STATES PATENTS

| 1,542,937 | Hammond | June 23, 1925 |
| 2,419,052 | Becker | Apr. 15, 1947 |
| 2,473,197 | Evans | June 14, 1949 |
| 2,547,173 | Rittner | Apr. 3, 1951 |
| 2,616,020 | Fay et al. | Oct. 28, 1952 |
| 2,816,233 | Krueger | Dec. 10, 1957 |
| 2,862,416 | Doyle | Dec. 2, 1958 |
| 2,870,310 | Van Oberbeek | Jan. 20, 1959 |
| 2,937,281 | Bosch | May 17, 1960 |
| 2,967,940 | Erb et al. | Jan. 10, 1961 |
| 2,984,729 | Hykes et al. | May 16, 1961 |